United States Patent [19]
Arques

[11] Patent Number: 5,003,167
[45] Date of Patent: Mar. 26, 1991

[54] DOCUMENT READER

[75] Inventor: Marc Arques, Grenoble, France

[73] Assignee: Thomson-CSF, Puteaux, France

[21] Appl. No.: 445,842

[22] PCT Filed: Oct. 19, 1989

[86] PCT No.: PCT/FR89/00128
§ 371 Date: Nov. 15, 1989
§ 102(e) Date: Nov. 15, 1989

[87] PCT Pub. No.: WO89/09959
PCT Pub. Date: Oct. 19, 1989

[30] Foreign Application Priority Data

Apr. 11, 1988 [FR] France ............................ 88 04768

[51] Int. Cl.⁵ ............................................. H01J 40/14
[52] U.S. Cl. ................................ 250/208.1; 340/708; 358/483
[58] Field of Search ................. 250/208.1; 340/707, 340/708; 358/483

[56] References Cited

U.S. PATENT DOCUMENTS 4,451,895 5/1984 Slinkowski .................... 340/708
4,475,239 10/1984 van Raamsdonk ............ 340/707
4,707,109 11/1987 Kanno et al. ................... 340/708

*Primary Examiner*—David C. Nelms
*Assistant Examiner*—Stephone B. Allen
*Attorney, Agent, or Firm*—Roland Plottel

[57] ABSTRACT

The invention concerns a photosensitive device (1) enabling the formation of the image of a document (10) and the conversion of this image into electrical signals with a view to its reproduction or transmission. To this effect, the photosensitive device (1) has a matrix (2) of photosensitive dots (P1 to P9) connected to an addressing device (46, 42) and a reading device (32). According to one characteristic of the invention, the photosensitive device (1) further has a light emitting optical pencil (15) enabling a photosensitive surface (5) of the matrix (2) to be used as a writing surface to fulfil a graphic tablet function.

23 Claims, 7 Drawing Sheets

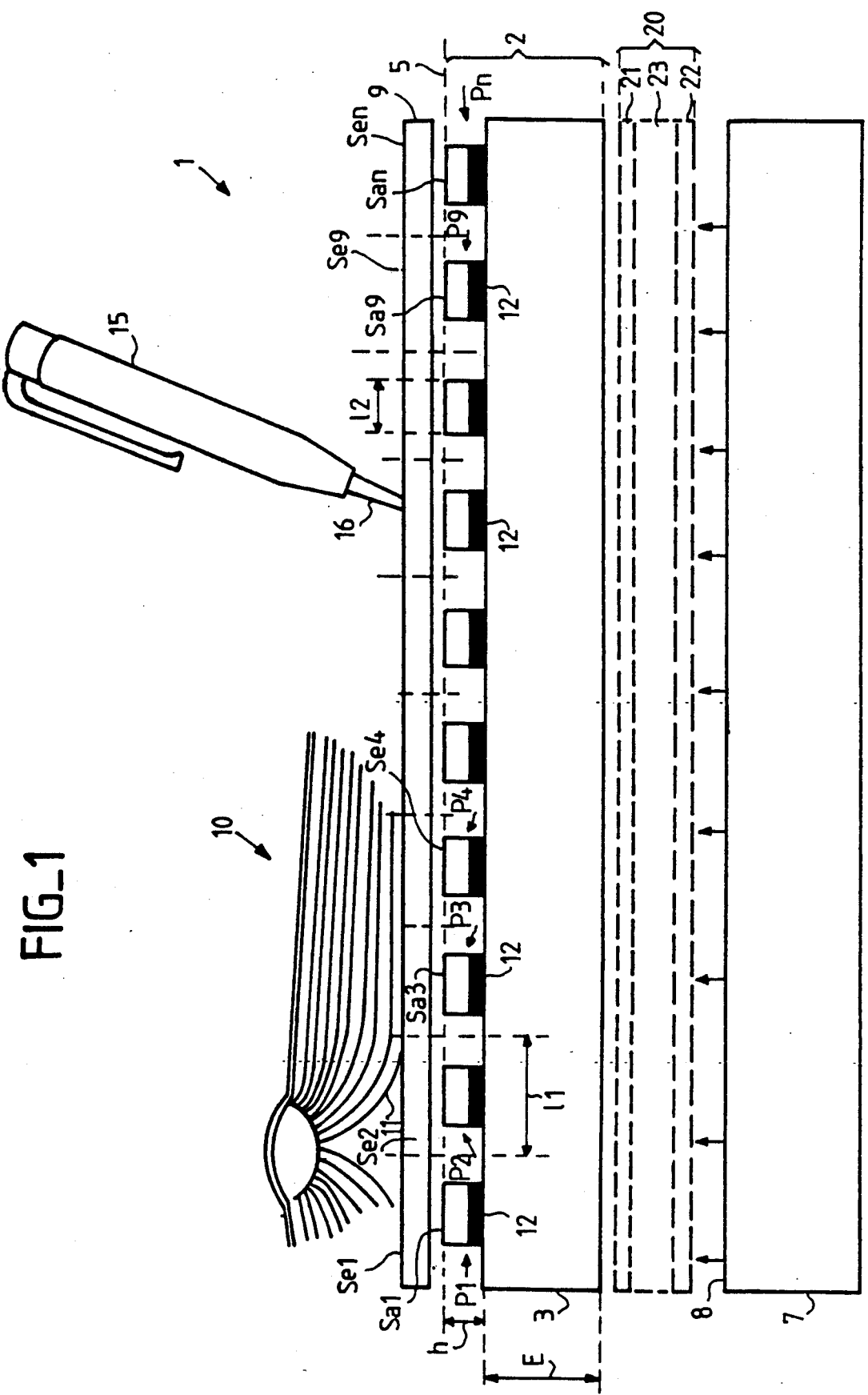

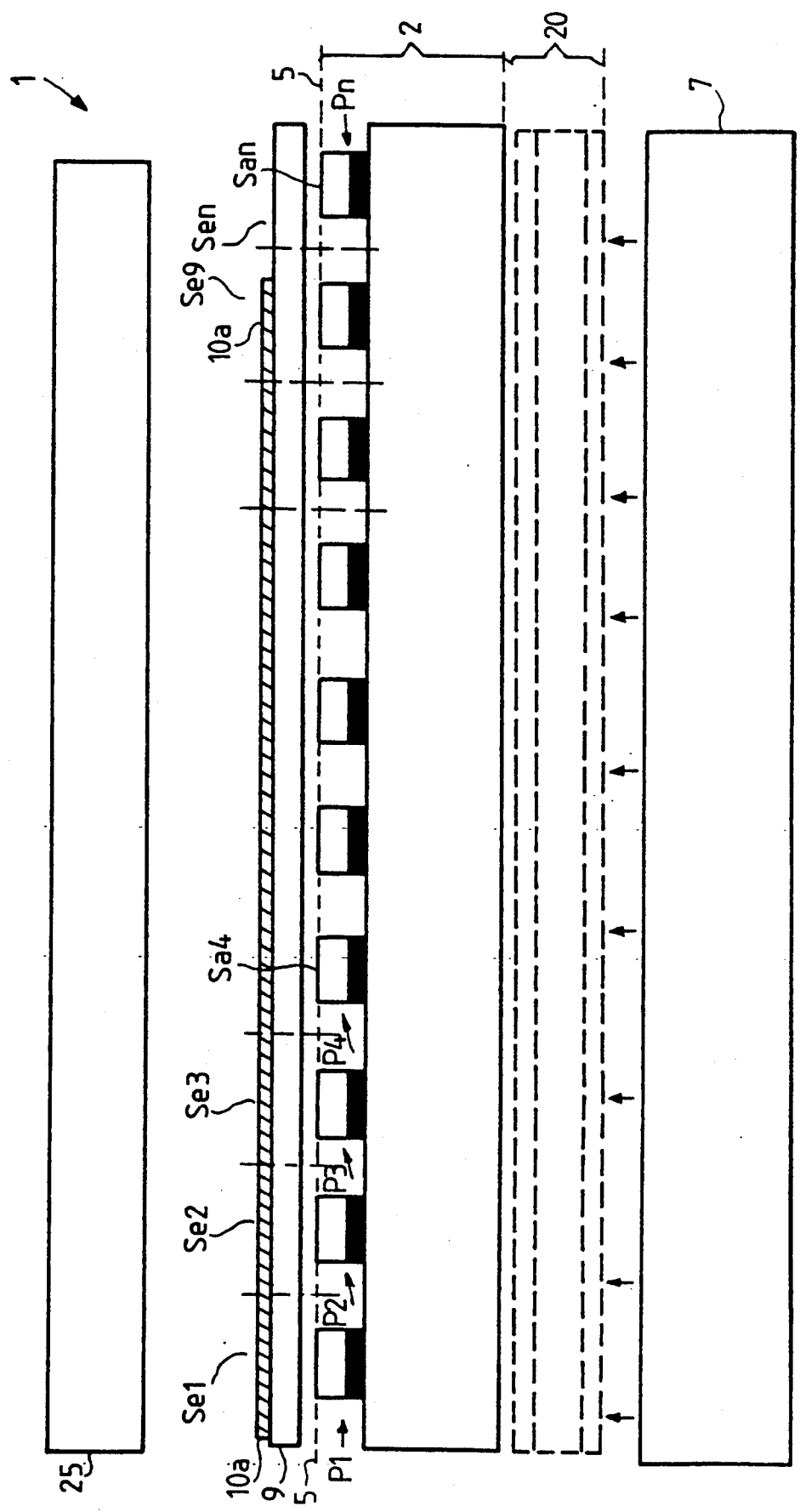
FIG_2

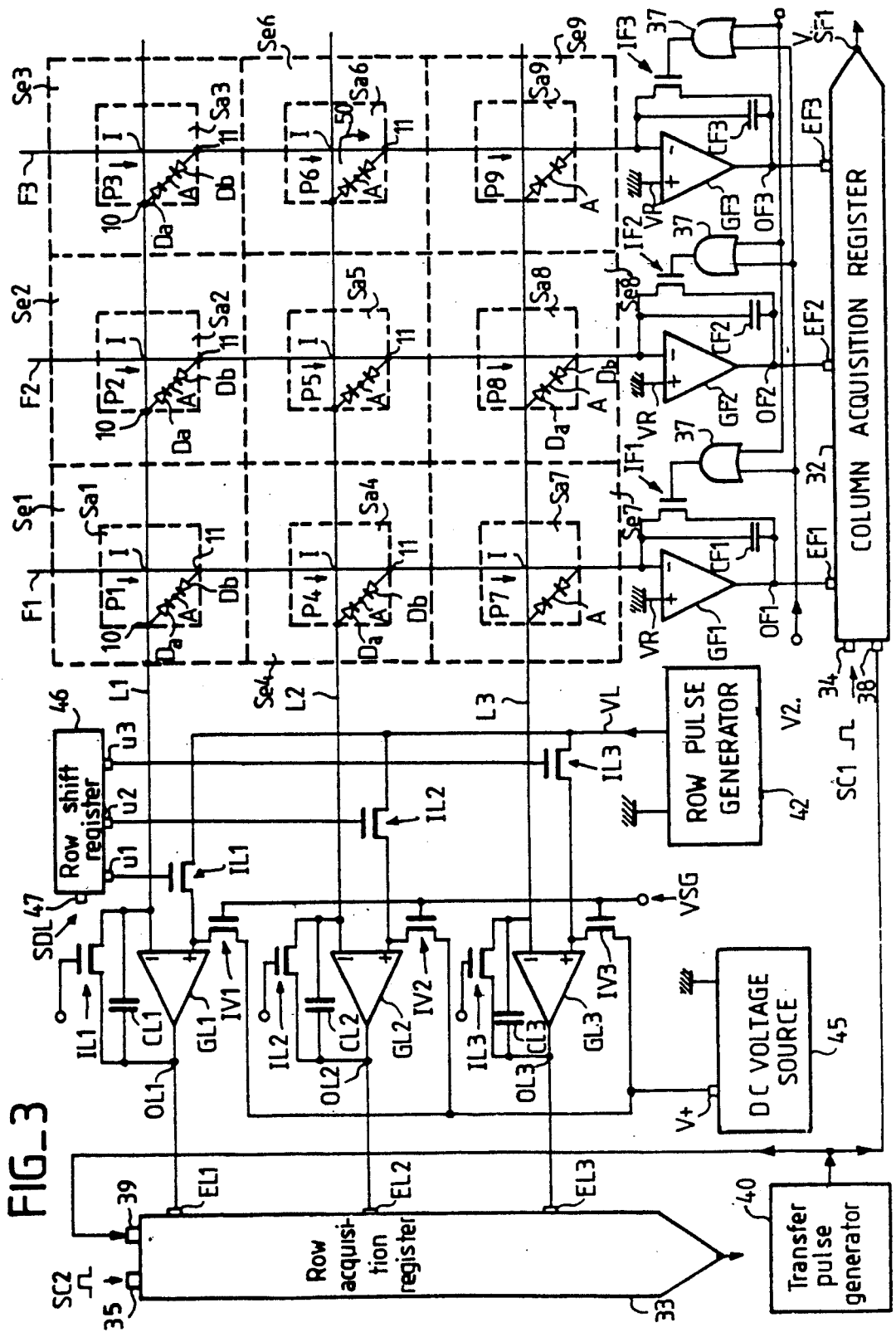
FIG_3

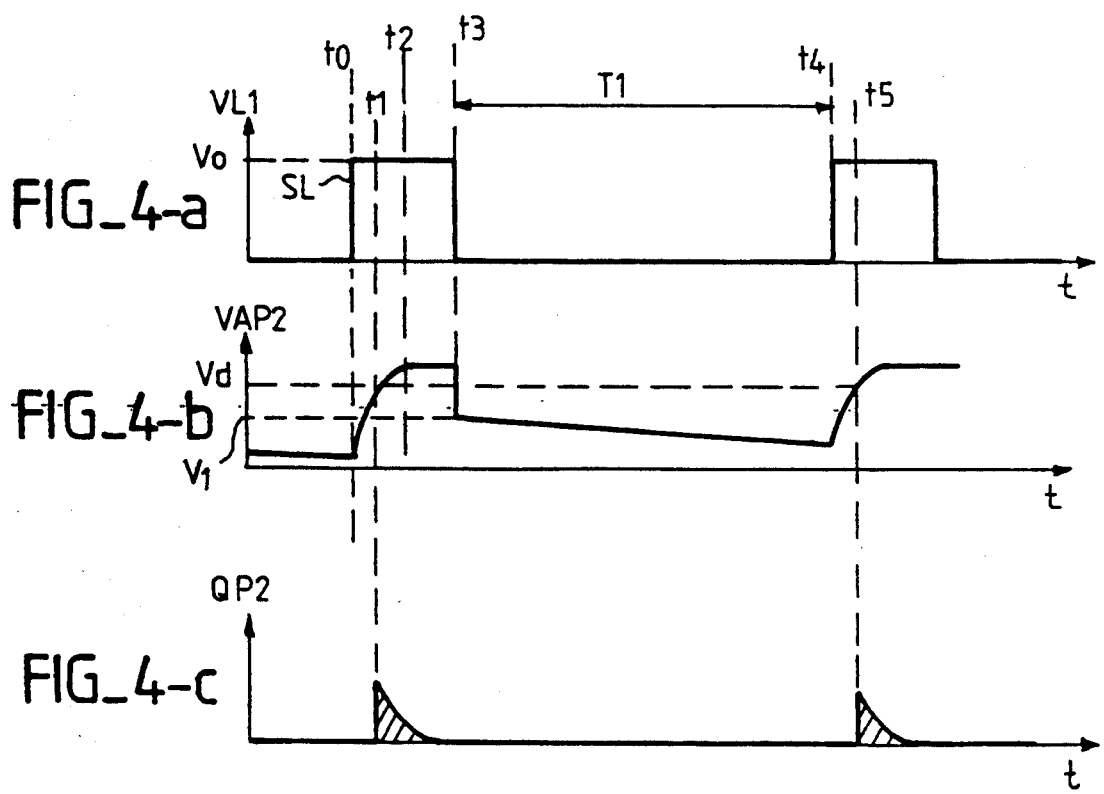

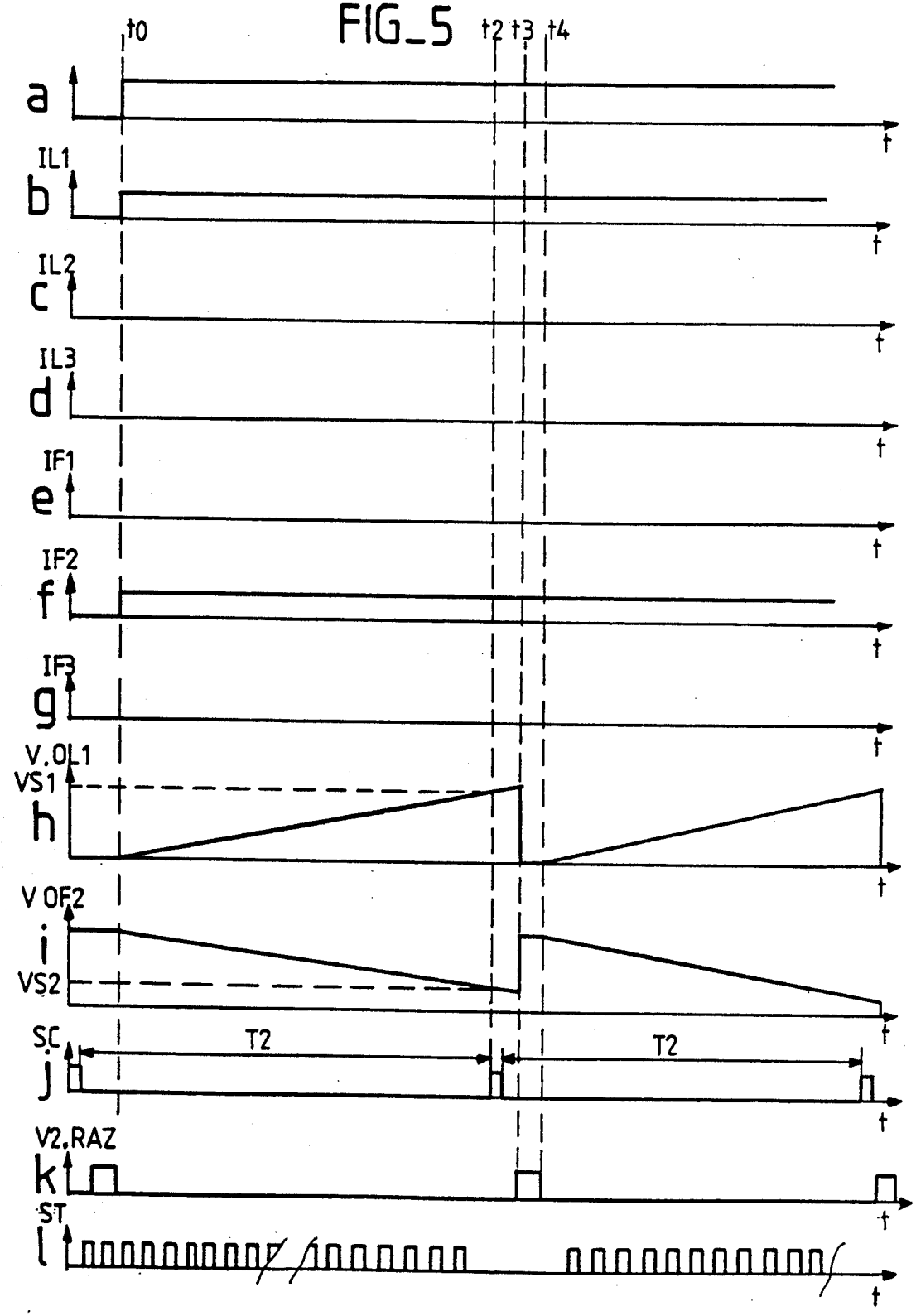

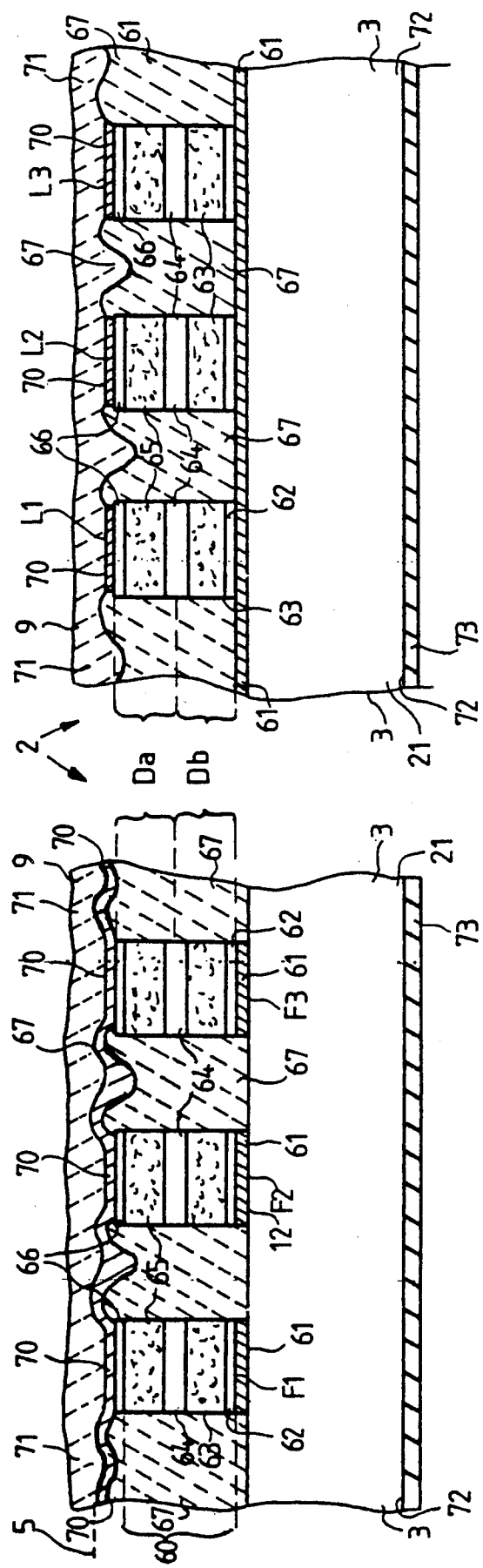
FIG_6-a
FIG_6-b

FIG_7
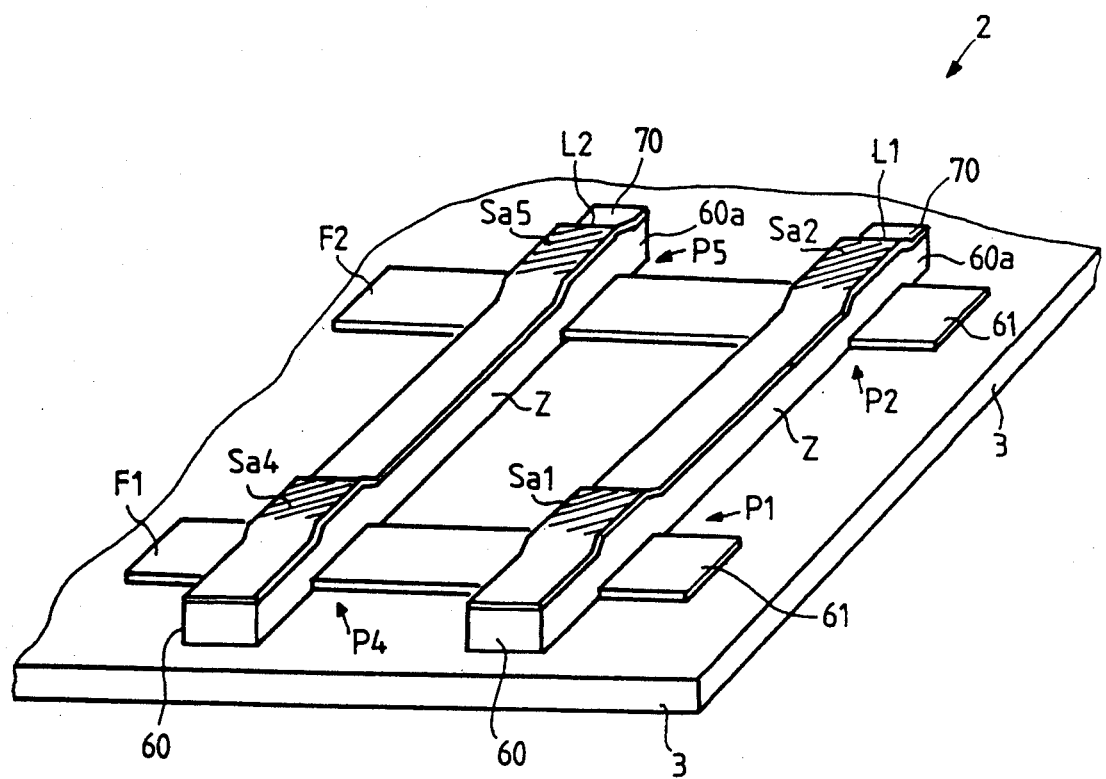

5,003,167

DOCUMENT READER

The invention concerns a photosensitive device of the type enabling the reading of a document, that is, a device enabling the formation of an image of an object or of the document, and the conversion of this document into electrical signals with a view, for example, to its reproduction or transmission.

There are known ways, notably in the field of radiology, to convert an image into electrical signals by means of a photosensitive detector, of a surface type, such as a matrix of photosensitive elements. The photosensitive matrix has a system of conductors in rows and a system of conductors in columns. At each intersection between a row conductor and a column conductor, there is a photosensitive assembly hereinafter called a photosensitive dot. The photosensitive dots are thus also organized in rows and columns. Each photosensitive dot is connected between a row conductor and a column conductor.

The number of photosensitive dots in a given surface determines the resolution of the image. It is possible to make matrices of photosensitive elements with great capacity, for example 2000×2000 photosensitive dots, to obtain an image with dimensions of the order of 40 cm. by 40 cm. Each photosensitive dot comprises a photosensitive element such as a photodiode, phototransistor, photoconductor etc., sensitive to the visible or near visible light photons.

These light photons are converted into electrical charges, and these electrical charges get collected in an electrical capacitor forming a storage capacity which may be formed, for example, by the capacitor of the photosensitive dot itself. A reading device can be used to interrogate the electrical status of the storage capacity and to convey the electrical charge, constituting the signal, towards a signal amplifier.

An example of a photosensitive matrix, made by the technique of deposition in thin layers, is given in a French patent No. 87 00716, published under No. 2 593 343. This French patent describes, firstly, the detailed working of a photosensitive matrix, each photosensitive dot of which is formed by a photodiode in series with a capacitor. This patent further describes a method for the fabrication of a matrix such as this, and the method for setting up the alternation, on a substrate, of electrically conductive layers, which may or may not be transparent, with semiconducting layers and insulating layers, with a view to obtaining the desired structure of the photosensitive dot.

One of the aims of the present invention is to enable the use of photosensitive matrices such as this in the field of office automation systems, particularly for the reading of documents, notably with a view to their reproduction or transmission.

However, it must be noted that a relatively large number of different structures of photosensitive dots is known but that, whatever may be the type of photosensitive dots used, a large-sized photosensitive matrix is a relatively complicated and, hence, expensive element which means that it is particularly important to be able to use a photosensitive matrix in an economical and profitable manner.

With this fact in view, the invention shows how to use a photosensitive matrix in a device that can fulfil at least two functions which, until now, were fulfilled by different and separate devices. This results not only in a more profitable and economical use of the photosensitive matrix but also in a reduction of the space occupied by equipment as well as in a possibility of extending the field of use, due to the possibility of interaction among different functions combined in one and the same piece of equipment.

According to the invention, a photosensitive device comprising a matrix of photosensitive dots, a source of light, said matrix comprising a system of conductors in rows and a system of conductors in columns, a photosensitive surface consisting of a plurality of elementary surfaces, each comprising a photosensitive dot, each photosensitive dot being connected between a row conductor and a column conductor, the light source producing a light radiation designed to illuminate a document located above the photosensitive surface, is characterized in that it further comprises, firstly, an optical pencil emitting a light and enabling the illumination of at least one elementary surface, and in that it comprises, secondly, means to distinguish the row conductor and the column conductor between which there is connected the photosensitive dot located in the designated elementary surface.

The invention will be better understood and other effects and advantages provided by it will appear from the reading of the following description, given as a non-restrictive example, and of the appended figures, among which:

FIG. 1 schematically and partially shows a photosensitive device according to the invention, and shows how it can fulfil, notably, a "document reader" function and a "graphic tablet" function;

FIG. 2 gives a schematic view of a second version of the photosensitive detector, particularly as regards the position of a light source used for the "document reader" function;

FIG. 3 gives a schematic view of a photosensitive matrix which can be used to fulfil the "document reader" function and the "graphic tablet" function;

FIGS. 4a, 4b and 4c represent signals used to explain the working of the photosensitive matrix shown in FIG. 3, in the case of the "document reader" function;

FIGS. 5a, 5b, 5c, 5d, 5e, 5f, 5g, 5h, 5i, 5j, 5k and 5l represent signals used to explain the working of the photosensitive matrix in the context of the "graphic tablet" function;

FIGS. 6a and 6b are lateral sections, along two orthogonal directions, giving a non-restrictive, exemplary, schematic view of an embodiment of the photosensitive matrix shown in FIG. 3;

FIG. 7 provides a schematic illustration, through a view in perspective, of a second embodiment of the photosensitive matrix.

FIG. 1 partially and schematically shows a photosensitive device 1 according to the invention.

The photosensitive device 1 has a photosensitive matrix 2. This photosensitive matrix 2 is represented by a substrate 3 bearing a plurality of photosensitive dots P1, P2, ..., Pn, each having at least one photosensitive element, as is explained in greater detail in a subsequent part of the description pertaining to FIG. 3.

Opposite the substrate 3, the end of the photosensitive dots P1 to Pn is contained substantially in one and the same plane, symbolized in FIG. 1 by a dotted line marked 5. This plane represents a photosensitive surface extending in a plane perpendicular to that of the figure. The photosensitive surface 5 is divided into plurality of n equal elementary surfaces Se1 to Sen, each containing photosensitive dot P1 to Pn. It must be noted that, in the depiction of FIG. 1, for the greater clarity of the figure, the proportions among the different dimensions have not been maintained: thus, for example, one side of an elementary surface Se1 to Sen may have a length l1 of the order of 200 micrometers, while the height h of a photosensitive dot P1 to Pn, above the substrate 3, is of the order of only some micrometers; the substrate 3 may itself have a thickness E of the order of 2 to 3 mm, for example, notably if this substrate is made of glass in order to be transparent, as is necessary in this version of the invention.

For, beneath the substrate, namely opposite the photosensitive dots P1 to Pn, there is a light source 7 of the surface type, the surface of which extends in a plane that is perpendicular to that of the figure. This light source 7 delivers a light radiation to which the photosensitive dots P1 to Pn are sensitive. The light flux (represented by arrows) is emitted by a face 8 of the light source 7, in a relatively homogeneous way all over this surface 8. The light source 7 may contain, to this effect, fluorescent tubes, for example, and the surface 8 may be formed by a perfectly diffusive wall, which is standard in itself.

It should be further noted that the photosensitive dots P1 to Pn have active surfaces Sa1 to San (located in a plane perpendicular to that of the figure and symbolized, in this figure, by the length 12 of their side) which are small enough to let through the light emitted by the light source 7 in a quantity sufficient to illuminate a object 10 or document to be read, that is placed flat against the photosensitive surface 5. In fact, in the non-restrictive example shown in FIG. 1, the document 10 is placed flat against a transparent screen 9, made of glass or plastic for example, that fulfils a function of mechanical protection with respect to the photosensitive surface 5. In practice, it is considered that the area of the active surface Sa1 to San of a photosensitive dot P1 to Pn should be, at most, 90% of that of the elementary surface Se1 to Sen, for the light emitted by the light source 7 to illuminate and be properly distributed on a face 11, to be analyzed, of the document 10. The light is reflected by the face 10 of the document 10 so that the light coming from the face 11 to be analyzed contains the image of this face and illuminates the photosensitive dots P1 to Pn of the matrix 2.

In this version of the photosensitive detector 1, the light source 7 is placed opposite the document 10 with respect to the matrix 2, and so that the photosensitive dots P1 to Pn are sensitive only to the light coming from the document 10 to be analyzed, an opaque screen 12 is placed between the substrate 3 and each of the photosensitive dots P1 to Pn.

According to one characteristic of the invention, the photosensitive device 1 further has an optical pencil 15 emitting a pencil of light 16 to which the photosensitive dots P1 to Pn are sensitive. Since the optical pencil 15 emits light, it is possible for an operator (not shown) to hold this optical pencil 15 in his hand, illuminate the photosensitive surface 5 by means of this optical pencil 15 and thus designate a given zone (formed by one or more contiguous elementary surfaces Se1 to Sen) at a given instant. The operator can thus successively designate different zones on the photosensitive surface 5 to constitute, for example, fixed reference marks at a distance from one another. The operator can also illuminate the photosensitive surface 5 so as to describe a curve of any shape on it.

The illumination of an elementary surface Se1 to Sen is detected by the photosensitive dot P1 to Pn, which is contained in this elementary surface and delivers a signal that enables it to be located. The location of a sequence of adjacent photosensitive dots enables the reconstitution of a curve plotted on the photosensitive surface 5 by means of the optical pencil 15.

The photosensitive device 1 of the invention may further fulfil a third function which is a display function. To this effect, the light source 7 may be formed, for example, by a display device which, through its face 8, projects an image that is seen through the photosensitive matrix 2, that is, through the photosensitive surface 5. Tests have shown that the image projected under these is visible through the photosensitive surface 5, efficiently, when the active surface Sa1 to Sa2 of the photosensitive dots P1 to Pn is equal to or smaller than substantially 50% of an elementary surface Se1 to Sen.

The light source 7 or light device which, in this version, also represents a display device, may be formed, for example, by a panel of electroluminescent diodes (not shown) arranged in rows and columns according to a matrix arrangement, the working of this panel being known per se: in the operation for the reading of the document 10, all the electroluminescent diodes are activated and give light; for operation as a graphic tablet, i.e. with the optical pencil 15, all the electroluminescent diodes are extinguished, and the light device 7 produces no light; in the operation with display, i.e. with projection of an image through the photosensitive surface 5, the matrix network of electroluminescent diodes is controlled, in a conventional way, to produce the desired image. It should be noted that, in this latter case, it may be particularly advantageous to use the optical pencil 15 to lay down reference marks, for example, or to plot a curve on the image projected by the light device 7.

It is noted that, in this configuration, the light device 7 is common to the document reader function and the image display function. Of course, the light device 7 may be of a different type: to fulfil both the light source function and the display device function, it may be formed, for example, by a plasma type display device which is standard in itself.

It is also possible to add the image display function by using a standard liquid crystal display device, represented by a rectangle 20 drawn with dashes, interposed between the photosensitive matrix 2 and the light device 7 which, in this case, forms solely a light source. The liquid crystal display device 20 is controlled by conventional means (not shown) in such a way that it either lets through the light emitted by the light device 7 at all the points of the face 8 (when working as a document reader) or is controlled to let through the light only at determined points so as to form an image which may be seen, as mentioned previously, through the photosensitive surface 5.

The liquid crystal display device 20 has, in a usual way, two walls or substrates 21, 22 bearing electrodes (not shown). Between these walls or substrates 21, 22, there is made a volume 23 filled with the liquid crystal. With a view to simplifying the making of the photosensitive device 1, the substrate 3 belonging to the photosensitive matrix 2 may also form the wall or substrate 21 of the liquid crystal display device 20.

FIG. 2 shows another version of the invention where the document 10a, to be analyzed, is of a transparent or semi-transparent type, such as, for example, a radiographic film. In this case, the document 10a is placed on the shielding screen or glass 9, i.e. on top of the photosensitive surface 5. The reading of the document 10a is got by means of a surface type light source 25 which is placed above the document 10a. This document 10a is thus placed between the photosensitive surface 5 and this second light source 25. The photosensitive dots P1 to Pn each pick up the light coming substantially from the face, before them, of the document 10a to be analyzed. The light image of this document is formed, this time, by transmission of light and not by reflection as in the case of the preceding example. In this configuration, to provide for the document reading and graphic tablet functions, it is not obligatory to have the light device 7, whether as a light source or as a display device, nor is it necessary to have liquid crystal display device 20. However, these elements may be kept.

The second light source 25 may be moved away from the document 10a to be analyzed so as to allow access to the optical pencil 15 (not shown in FIG. 2). It has to be be further noted that, in the case of a document such as a radiographic film, the optical pencil 15 may be used to put down reference marks, overlaid on the image itself and that, to this effect, the light device 7, as a source of light, may be useful for illuminating the image borne by the document 10a while, at the same time, having a very small influence on the photosensitive dots P1 to Pn.

FIG. 3 shows a partial view of the electrical diagram of the photosensitive device 1 according to the invention and illustrates, in particular, as a non-restrictive example, the photosensitive matrix 2 and the structure of the photosensitive dots that it has. This structure is particularly valuable in that it enables the working of the matrix in both the "document reader" function and the "graphic tablet" function.

The matrix 2 has a plurality of photosensitive dots P1, P2, . . . ,P3 which are arranged in rows and columns, and are each formed by a first element and a second element, Da, Db respectively, series mounted with each other, at least one of these two elements Da, Db being photosensitive. In the non-restrictive example shown in FIG. 3, the first and second elements Da, Db are each formed by a diode, the two diodes Da, Db being series mounted with one another and mounted upside down with respect to each other, i.e. in opposite directions of conduction with respect to each other. An assembly of photosensitive dots such as this is described in a French patent application No. 86 14058 filed on 9th October 1986 on behalf of THOMSON-CSF. This patent application relates to a solid state photosensitive device, the photosensitive dots of which are formed in a same way as mentioned above. This patent application describes the working of photosensitive dots of this type in detail, and further describes a reading method and a method for the fabrication of a matrix comprising photosensitive dots of this type. Hence, this French patent application No. 88 14058 should be considered to form part of the present description.

In the non-restrictive example described, the number of photosensitive dots P1 to P9 is restricted to 9 according to a 3×3 matrix assembly, in order to simplify FIG. 3. However, in the spirit of the invention, this matrix assembly may have a far greater capacity, of several millions of dots for example, as mentioned earlier.

The matrix 2 has conductors L1 to L3 in rows and conductors F1 to F3 in columns, the number of each type of these conductors being restricted to three in view of the example of FIG. 3 where only 9 photosensitive dots P1 to P9 are shown.

In practice but not necessarily, and in a manner which is standard in itself, the photosensitive dots P1 to P9 are each formed at the intersection of a row conductor L1 to L3 and a column conductor F1 to F3. Each photosensitive dot P1 to P9 has a first end 10 connected to a row conductor L1 to L3, and has a second end 11, connected to a column conductor F1 to F3. For each photosensitive dot P1 to P9, the joining point between the first diode Da and the second diode Db forms a zone A at which there may be stored charges generated by at least one of the two diodes Da, Db. The quantity of charges is proportionate to the illumination of the photosensitive dot, i.e. the illumination of the photosensitive element or elements that it comprises.

In effect, the two diodes Da, Db may be photosensitive elements but, according to one characteristic of the invention, it is enough for only one of these two diodes Da, Db to be photosensitive to enable the two planned working modes, namely: working as a document reader and working as a graphic tablet. As is clearly seen from the working, explained in the rest of the description, the diode Da or Db which is obligatorily photosensitive is the diode which is reverse biased during an illumination of the photosensitive points P1 to P9.

In the non-restrictive example of the invention, for each photosensitive dot P1 to P9, the first and second diodes Da, Db are photodiodes, and they are mounted so that their anodes, 10 and 11 respectively, are respectively connected to a row L1 to L3 and to a column F1 to F3. However, in the spirit of the invention, the photodiodes Da, Db could be mounted in directions of conduction opposite to those shown in FIG. 3.

It should be further noted that the term "diode" is intended to define not only a semiconductor diode but also, as the case may be, a transistor or phototransistor of the NIPIN or PINIP type for example, once the base of this transistor is floating, that is, unconnected.

It should be further noted, as appears clearly from the mode of operation described in the above-mentioned French patent application No. 86 14058 as well as from the explanations that follow in the present description, that, of the two diodes Da, Db, the one that is obligatorily photosensitive is always reverse biased, so that it is always capable of generating photocharges if it is illuminated. Consequently, the function of a photosensitive element such as this may be fulfilled by a photosensitive element other than a photodiode, and this photosensitive element may consist, for example, of a photoresistor.

Furthermore, in assuming (as shown in FIG. 3) that the first and second elements Da, Db of each photosensitive dot P1 to P9 consist of diodes Da, Db, the second diode Db of which is the one that is obligatorily photosensitive, it is noted that the function fulfilled by the first diode Da is that of a commutator or switch which, when the first diode Da is forward biased, is "on" (that is, it has low resistance) and which, when the first diode Da is reverse biased, is "off" (that is, it has very high resistance).

The working of the matrix 2, in the context of the "document reading" function, corresponds to the working described in the above-mentioned French patent No. 86.14058 and makes it necessary, notably that, for each photosensitive dot P1 to P9, during the illumination of these dots by the light coming from the document 10, 10a to be read, the two diodes Da, Db should be reverse biased. This is obtained by taking the column conductors F1 to F3 to a given potential or reference voltage VR and, furthermore, by applying, successively to each of the row conductors L1 to L3, a voltage pulse with reference to the column reference voltage VR. This pulse is a positive pulse in view of the direction of assembly of the diodes Da, Db in the non-restrictive example shown in FIG. 3.

An indication is given here below, as a non-restrictive example, of a possible assembly (other arrangements being possible to obtain the desired working mode). Each column conductor F1 to F3 is connected to the negative input "−" of an amplifier GF1 to GF3 mounted as an integrator. An integration capacitor CF1 to CF3 is mounted between the negative input "−" of the amplifier GF1 to GF3, and the output OF1 to OF3 of this amplifier. The second positive input "+" of each amplifier GF1 to GF3 is connected to the above-mentioned reference potential VR, which may be the ground, for example, as shown in FIG. 3. Each integrator amplifier GF1 to GF3 further includes a switch IF1 to IF3 called a resetting switch, mounted in parallel with the integration capacitor CF1 to CF3. The resetting switches IF1 to IF3 are formed by MOS transistors controlled by resetting signals V.RAZ. The resetting switch IF1 to IF3 of a given integrator amplifier GF1 to GF3 is kept "closed", that is "on" so as to short-circuit the integration capacitor CF1 to CF3 except during the sequence for reading the photosensitive dot P1 to P9 which is connected to this amplifier. The outputs OF1 to OF3 of the amplifiers GF1 to GF3 are connected to an analog data acquisition register 32, called a column acquisition register, formed, for example, by a shift register with parallel input EF1 to EF3 and series output SF1, of the CCD (charge-coupled device) type, for example.

The connection diagram of the column conductors F1 to F3, which has just been described, is a standard diagram which represents a reading device and enables the acquisition of the charges that flow in these column conductors during the reading of the photosensitive dots P1 to P9.

By contrast, at the connections of the rows L1 to L3, a slightly greater complexity than in the prior art enables the use of one and the same structure of photosensitive dots P1 to P9 for both types of operation (document reader and graphic tablet).

In the non-restrictive example of the description, the row conductors L1 to L3 should be connected not only to an addressing device (having, notably, a row shift register 46 and a pulse generator 42) enabling the application of a positive pulse successively to each of the row conductors L1 to L3 for working as a document reader, but also to means that make it possible, for each photosensitive dot P1 to P9, to forward bias one of the two diodes Da, Db and to reverse bias the other diode (for working in graphic tablet mode), and to means that further make it possible to recognize that row conductor L1 to L3 to which a photosensitive dot, P1 to P9, illuminated by the optical pencil 15, is connected. The column conductor to which the thus illuminated photosensitive dot is connected is recognized by means of the integrator amplifiers GF1 to GF3.

Each of the row conductors L1 to L3 is connected to the negative input "−" of an integrator amplifier GL1 to GL3, of the same type as the integrator amplifiers connected to the columns F1 to F3. In other words, the potential to which each row conductor L1 to L3 is taken corresponds to the potential of the second input or positive input "+" of the amplifier GL1 to GL3. For each amplifier GL1 to GL3, an integration capacitor CL1 to CL3 is mounted between the negative input "−" and the output OL1 to OL3 of this amplifier. In parallel, on each of these integration capacitors CL1 to CL3, there is mounted a resetting switch IL1 to IL3. These switches are formed, for example, by MOS transistors controlled by second resetting signals V2.RAZ. These second resetting signals V2.RAZ are designed to short-circuit the integration capacitors CL1 to CL3 and CF1 to CF3 during a given stage of the operation in "graphic tablet" mode, and they are also applied to the integration capacitors mounted on the amplifiers GF1 to GF3 of the column conductors F1 to F3. To this end, the switches IF1 to IF3, mounted on the amplifiers GF1 to GF3, are controlled by the first resetting signals V.RAZ or by the second resetting signals V2.RAZ by means of OR circuits 37. The outputs OL1 to OL3 of the amplifiers GL1 to GL3 are connected to inputs EL1 to EL3 of a second acquisition register 33, called a row acquisition register, formed, for example, by a shift register of the type with parallel input and series output SOL. In the non-restrictive example described, the column and row acquisition registers 32, 33 respectively have a control input 34, 35 to which loading control signals, SC1, SC2 respectively, are applied when it is desired to load these registers 32, 33 with the signals that are applied to their inputs inputs EF1 to EF3 and EL1 to EL3.

The pieces of information contained in the acquisition registers 32, 33 are transferred to main memories (not shown) that are standard per se. These pieces of information are then processed in a standard way so as to reconstruct an image formed on the sensitive surface 5 of the matrix 2, either in the document reader mode (solely for the column acquisition register 32 in this case) or in the graphic tablet mode. The output of the signals contained in the acquisition registers 32, 33 is operated under the control of transfer pulses or signals ST applied to a transfer control input 38, 39, respectively included in the column acquisition register 32 and the row acquisition register 33. These transfer pulses ST are delivered by one and the same transfer pulse generator 40, so as to determine a known phase relationship in the output of the signals of the two acquisition registers 32, 33 with a view to designating that row conductor L1 to L3 and that column conductor F1 to F3 between which a photosensitive dot P1 to P9 was connected at a given instant by the optical pencil 15 (shown in FIG. 1).

Since the potential of a row L1 to L3 corresponds to the potential that is applied to the positive input "+" of the amplifier GL1 to GL3, to which this row conductor is connected, the positive input "+" of each of the amplifiers GL1 to GL3 may be connected either to a row pulse generator 42, which delivers pulses SL of positive voltage with respect to the ground, or to a DC voltage source 45 which delivers a positive voltage with respect to the ground, namely with respect to the potential of the columns F1 to F3. To this end, each positive input "+" of the amplifiers GL1 to GL3 is connected, firstly, to the row pulse generator 42 by means of a row pulse switch IL1 to IL3 and, secondly, to the DC voltage source 45 by means of another switch IV1 to IV3. At an amplifier GL1 to GL3, only one or the other of these switches is made "on" at one and the same instant.

The switches IL1 to IL3 are formed by MOS transistors, and are controlled respectively by an output U1, U2, U3 of a row shift register 46, so as to successively connect the row conductors L1, L2, L3 to the row pulse generator 42. This sequence takes place under the control of row shift signals SDL that are applied to a shift control input 47 of the shift register 46.

The other switches IV1 to IV3, also connected to the positive inputs "+" of the amplifiers GL1 to GL3, are also MOS transistors and are controlled simultaneously by a DC voltage signal VSG which is set up at the sime time as the "graphic tablet" function is set up.

In this configuration, when it is the "document reader" function that is in progress, a voltage pulse SL delivered by the row pulse generator 42 is applied to the positive input of the amplifier GL1, and this positive pulse is recovered at the negative input "−" of this amplifier, i.e. at the row conductor L1, so that the pulse SL is applied to all the photosensitive dots P1 to P3 connected to this row conductor. As is explained in greater detail in FIG. 4, relating to operation in document reader mode, the application of this row pulse SL results in an injection of charges into each of the column conductors F1 to F3. These charges each correspond to the charges stored in the zones A of the photosensitive dots P1 to P3. The signals forming these charges are at the output of the amplifiers GF1 to GF3 in the form of voltage, and these signals are injected into the column acquisition register 32. The integration capacitors CF1 to CF3, mounted on the amplifiers GF1 to GF3 are then short-circuited, and the row pulse generator 42 is connected to a following row conductor L2 to which there is also applied a row pulse SL that leads to the injection, into each of column conductors F1 to F3, of a charge signal corresponding to the charges that have collected at the point A of the photosensitive dots P4 to P6. With the column acquisition register 32 having been emptied beforehand, and with the charges that it contained having been transferred into a main memory as mentioned earlier, the column acquisition register 32 may again be loaded with the charges contained at the point A of the photosensitive dots P4, P5, P6 as in the preceding example; and the same cycle is set up again for the third row conductor L3, and so on until the reading of all the photosensitive dots of all the rows of the matrix. Since the signals corresponding to the entire image of the document to be read are delivered at the output SF1 of the column acquisition register 32, they can be stored in a main memory.

For working in graphic tablet mode, all the switches IL1 to IL3, connected to the positive inputs "+" of the row amplifiers IV1 to IV3, are in the open state, and the DC voltage switches IV1 to IV3 are all in the closed state, that is, all the positive inputs "+" of the row amplifiers GL1 to GL3 are connected to the positive bias V+ of the DC voltage delivered by the DC voltage source 45. Under these conditions, all the first diodes Da are forward biased, that is, a same voltage is recovered at the different points A as the voltage delivered by the DC voltage 45, except for the threshold of the diode Da. By contrast, the second diode Db of each photosensitive dot P1 to P9 remains reverse biased and, if it is illuminated, it generates charges that flow in the row conductor and the column conductor, between which there is connected the photosensitive dot P1 to P9 located in the elementary surface Se1 to Sen, illuminated by the optical pencil 15. For example, if the optical pencil illuminates the elementary surface Se6, that is, the photosensitive dot P6, the zone A of this photosensitive dot is at a positive potential close to the potential delivered by the DC voltage source 45. Consequently, the second photosensitive diode Db is reverse biased and delivers charges, and a current, represented by an arrow 50, flows on the row L2 and the column F3, in crossing the photosensitive dot P6, i.e., in going through the diodes Da, Db of this dot P6. The result thereof is a variation in voltage at output OF3 of the third column amplifier GF3 (decrease in voltage) and, simultaneously, a variation in voltage at the output OL2 of the second row amplifier GL2 (increase in voltage). These voltage variations form signals that make it possible to distinguish the second row conductor L2 and the third column conductor F3 from the other row conductors and the other column conductors and, consequently, to determine that the elementary surface Se6 has been designated or illuminated by the optical pencil 15. Assuming that the light pencil 16 given by the optical pencil 15 (shown in FIG. 1) simultaneously illuminates several contiguous elementary surfaces, there will simultaneously be signals delivered by contiguous row conductors and by contiguous column conductors, so that it is possible to determine an illuminated central zone.

Should it be a curve that is described on the photosensitive surface 5, there are, successively, several photosensitive dots P1 to P9 that are illuminated but, for each of them, it is only between the row conductor L1 to L3 and the column conductor F1 to F3, between which the photosensitive dot is connected, that there is a simultaneity in the signals delivered. This simultaneity has to be maintained or identified, during the acquisition and the transfer of these signals, towards the main memories of a central processing unit (not shown). Thus, firstly, the values contained at output OL1 to OL3 of all the row amplifiers GL1 to GL3 and, secondly, the values present at output OF1 to OF3 of all the column amplifiers GF1 to GF3, are loaded simultaneously into the row acquisition register 33 for the row amplifiers GL1 to GL3 and into the column acquisition register 32 for the column amplifiers GF1 to GF3. With this loading operation having been performed, all the integration capacitors CL1 to CL3 and CF1 to CF3 are discharged, namely short-circuited, by the resetting switches which are themselves controlled by the second resetting signals V2.RAZ. All the row and column amplifiers GL1 to GL3 and GF1 to GF3 are then again ready to integrate the current which, as the case may be, is injected into the row conductor L1 to L3 or the column conductor F1 to F3 to which these amplifiers are connected. It is recalled that the current which, at a given instant, flows on a row conductor L1 to L3 and a column conductor F1 to F3, corresponds to the photocharge generated by the second diode Db of the photosensitive dot P1 to P9, which is illuminated at this given dot and is located at the intersection of this row conductor and this column conductor and, in a way, the recognition of the row conductor L1 to L3 gives the coordinate "Y" and the recognition of the column conductor gives the coordinate "X".

During the time when the row and column amplifiers GL1 to GL3 and GF1 to GF3 are capable of integrating the current that is injected into them, the pieces of data or signals contained in the acquisition registers 32, 33 may be transferred towards main memories. This is accomplished by the simultaneous application, to both acquisition registers 32, 33, of the same transfer control pulses ST, delivered by the transfer signal generator 40. These transfer signals ST are delivered at a frequency of 1 MHz for example. Under these conditions, assuming that the matrix 2 is, for example, a matrix of four million photosensitive dots formed by means of 2,000 row conductors and 2,000 column conductors, the simultaneous transfer of the 2,000 pieces of data stored in the row acquisition register 33 and of the 2,000 pieces of data stored in the column acquisition register 32 is done in a time of 2 milliseconds. If the sides of an elementary surface Se1 to Se9 have a same length 11 of the order of 100 micrometers for example, and if, furthermore, the speed of movement of a light pencil on the photosensitive surface 5 is of the order of three to four cm. per second, then the time that elapses between the start of the illumination of an elementary surface Se1 to Se9 and the instant when this elementary surface is entirely illuminated is much greater than the above-mentioned data transfer time, so that the acquisition of data relating to a full image of the photosensitive surface 5 may be done during the time needed to cross an elementary surface.

In the non-restrictive example shown in FIG. 3, the active surfaces Sa1 to Sa9 of the photosensitive dots P1 to P9 are much smaller than the elementary surfaces Se1 to Se9. In using the term "much smaller", we mean that these active surfaces Sa1 to Sa9 are not only smaller than the elementary surfaces Se1 to Se9, ino order to prevent short-circuits between adjacent photosensitive dots, as is the case in practice, but also sufficiently small in order to further let through a quantity of light that is sufficient to illuminate the document 10, 10a to be analyzed, or to project an image under satisfactory conditions, as has already been explained with reference to FIG. 1. The active surface Sa1 to Sa9 of a photosensitive dot P1 to P9 corresponds to the section of the photosensitive element that this photosensitive dot includes, that is, generally the surface of intersection between the row conductors L1 to L3 and the column conductors F1 to F3, this surface being given by the width of these conductors.

FIGS. 4a to 4c illustrate the working of the photosensitive matrix 2 in the document reader mode which has been explained with reference to FIG. 3.

FIG. 4a shows the application, to the first row conductor L1, of a row pulse SL delivered by the row pulse generator 42, so as to illustrate, in particular, the working of the second photosensitive dot P2.

FIG. 4b represents the variations in potential VA, in the zone A of the second photosensitive dot P2 located at the intersection between the row conductor L1 and the column conductor F2.

FIG. 4c illustrates the correlation in time between the charges Q delivered by the photosensitive dot P2 and the application of the row pulses SL. It has to be noted that FIG. 4c shows only the charges generated by illumination. It does not show charges that may flow in the column conductors F1 to F3, solely as a result of the voltage variations applied to the photosensitive dots.

In FIG. 4a, at the instant t0, there starts a row pulse SL which reaches an amplitude VO. This amplitude VO is kept until an instant t3. FIG. 4b shows that, with the start of the pulse SL, the voltage VA in the zone A increases, from the instant t0, until it reaches a value that is substantially equal to the value VO at an instant t2 which precedes the instant t3. FIG. 4c shows that a quantity of charges Q2 flows in the column F2. These charges are generated by the second photosensitive dot P2 at an instant t1 between the instant t0 and the instant t2. This instant t1 corresponds to the moment when the first diode Da goes into forward bias. At the instant t3, the pulse SL, applied to the row conductor L1 (FIG. 4a), goes from the value VO to zero, so that the two diodes Da and Db are reverse biased and behave like capacitors. It is noted that the voltage Va at the point A (FIG. 4b) has passed to a value V1 which is substantially equal to half of VO. This confirms that the two diodes Da and Db are reverse biased. Thus, starting from the instant t3 onwards, charges may be stored in the zone A, generated by the illumination of the photosensitive dot P2. The accumulation of the charges leads to a decrease in the voltage VA in the zone A (as shown in FIG. 4b). At the instant t4, a second row pulse SL applied to the first row conductor L1, creates a variation of the voltage VA (FIG. 4b). The voltage VA increases to reach a value Vd at an instant t5. At this value Vd, the diode goes back into forward bias. The result thereof is the injection of a second charge Q into the second column F2. This cycle is repeated in a same way for as long as the reading of a document lasts. A similar operation is obtained for all the photosensitive dots P1 to P9 of the photosensitive matrix 2, through the application of the row pulses SL to each of the row conductors L1 to L3, successively, in doing so during the period T1 between two pulses of row signals SL applied to one and the same row conductor.

FIGS. 5a to 5l illustrate the working of the photosensitive matrix 2 in the case of operation in graphic tablet mode.

Assuming that, starting from an instant t0, only one photosensitive dot is illuminated, for example the second photosensitive dot P2, this illumination is illustrated in FIG. 5a by a square pulse which starts at the instant t0. FIGS. 5b and 5f show that, at the instant t0, the flow of a current I starts in the first row conductor L1 and in the second column conductor F2. FIGS. 5c, 5d, 5e. 5g show that no current flows in the other row and column conductors when the second photosensitive dot P2 alone is illuminated. FIG. 5h illustrates a variation in output voltage V.OL1 created at the output of the first row amplifier GL1 by the integration of the current IL1. FIG. 5i shows a variation in output voltage V.OF2 generated at the output of the second column amplifier GF2 by the column current IF2.

FIG. 5j shows that, at an instant t2, the loading control signal SC is applied to the acquisition registers 32, 33 in order to load these registers with the signals that correspond to the output voltages of the amplifiers GL1 to GL3 and GF1 to GF3. Because only the second photosensitive dot P2 is illuminated, only the output voltages V.OL1 and V.OF2 (FIGS. 5h and 5j) which correspond respectively to the first row amplifier GL1 and the second column amplifier GF2, are modified. The signals thus charged are the voltage levels VS1, VS2 that the output voltages V.OL1 and V.OF2 (FIGS. 5h and 5i) have at the instant t2.

FIG. 5k illustrates the application of the second resetting signal V2.RAZ at an instant t3 which follows the end of the loading control signal SC. The second resetting signal V2.RAZ is used to short-circuit all the integration capacitors CL1 to CL3 and CF1 to CF3, so as to prepare all the row and column integrating amplifiers, GL1 to GL3 and GF1 to GF3, to integrate a current, if any, on a row or a column, during a following cycle. The next cycle starts at an instant t4, corresponding to the end of the signal V2.RAZ. Starting from this signal, the above-described operations are repeated. It is seen that, in this operation, the integrator amplifiers GF1 to GF3, each connected to a row conductor L1 to L3 and the column conductor GF1 to GF3, each connected to a column conductor F1 to F3, fulfil a current detecting function.

Assuming that the operation in graphic tablet mode has started before the first instant t0, the operation cycle that has just been described has therefore taken place. This means that the pieces of data have already been transferred into the acquisition registers 32, 33. The data or signals contained in the acquisition registers 32, 33 are transferred to the main memories during a transfer time T2 between the end of a loading control signal SC and the start of the next loading control signal SC, as shown in FIG. 5j. This transfer of data contained in the acquisition registers 32, 33 is done by applying, during the transfer time T2, the transfer pulses ST (shown in FIG. 5l) simultaneously with the two acquisition registers 32, 33.

FIGS. 6a and 6b are lateral sections along two orthogonal directions showing, as a non-restrictive example and schematically, a first embodiment of a photosensitive matrix 2 according to the invention.

The photosensitive matrix 2 is formed on a transparent substrate 2, made of glass, for example, or, again, of quartz. On the substrate 3, there is deposited a layer 61 made of an electrically conductive material which is opaque to light and is made of chromium or molybdenum for example. This conductive layer 61 is etched so as to form the column conductors F1 to F3. It should be noted that, since the column conductors are opaque, they may form the screens 12 shown in FIG. 1, which are placed in the substrate and are placed between the substrate and the photosensitive dots P1 to Pn. The conductive layer 61 is covered, after etching, by a stack 60 of several semiconducting layers 62, 63, 64, 65, 66, designed to form the first and second diodes Da and Db, placed one on top of the other. In the nons-restrictive example described, both these diodes Da and Db are photodiodes: first of all, above the conductive layer 61, there is a layer 62 of hydrogenated, amorphous silicon, doped with a P type impurity. Then, above the P doped silicon layer 62, there is a layer 63, made of intrinsic, hydrogenated, amorphous silicon. Then, on top of the intrinsic, amorphous, silicon layer 63, there is a hydrogenated, amorphous silicon layer 64, doped with an N type impurity, which is phosphorus for example. Thus, semiconducting layers have been deposited and, with these semiconducting layers, the second diodes Db are made. The third semiconducting layer 64, made of hydrogenated, amorphous silicon doped with an N type impurity, is common also to the first diodes Da. Then, above this third semiconducting layer 64 of N doped silicon, there is a layer 65 of intrinsic, hydrogenated, amorphous silicon and then, finally, there is deposited a layer 66 of hydrogenated, amorphous silicon doped with a P type impurity, for example boron. The five semiconducting layers 62, 63, 64, 65, 66 are then etched in a pattern of islands. On top of the last layer 66 made of P doped amorphous silicon, there is deposited a layer 67 made of an electrically insulating and transparent material, made of silicon nitride for example. In a standard way, apertures are made in this latter insulating layer 67, above the first diodes Da, so as to put these diodes in contact with a layer 70 made of an electrically conductive and transparent material, indium-tin oxide (ITO) for example. This conductive layer 70 is etched to form the row conductors L1 to L3.

There may be further deposited, on top of the layer 70, after this layer 70 has been etched to form the row conductors L1 to L3, a transparent insulating layer 71, made of silicon nitride for example, the role of which is to achieve mechanical shielding. This layer 71 thus makes it possible, if necessary, to replace the shielding transparent glass or screen 9 placed on top of the photosensitive surface (as shown in FIG. 1).

It is further possible to use the substrate 3 of the photosensitive matrix 2 to make one of the walls, the first wall 21 for example, of the liquid crystal display device 20 shown in FIG. 1. It is enough, to this effect, to deposit an electrically conductive and transparent layer 73, made of indium-tin oxide (ITO) for example, on a face 72 of the substrate 3 which is opposite the diodes Da, Db. This transparent conductive layer forms, for example, the solid electrode surface which comprises, in a standard way, a liquid crystal display device.

FIG. 7 is a view in perspective giving a schematic and partial view of the photosensitive matrix 2 in another embodiment. This novel embodiment has the advantage, as compared with the embodiment shown in FIGS. 6a, 6b, of requiring fewer masking and etching operations.

In the non-restrictive example shown in FIG. 7, the electrically conductive layer 61 has been deposited on the substrate 3 and then etched so as to form the column conductors F1, F2. On the column conductors, there are then etched the five semiconducting layers 61 to 65 which form a stack 60, designed to form the superimposed diodes Da and Db. Then, on top of the stack 60 of semiconducting layers, the transparent, upper, electrically conducting layer 70 is deposited. This layer 70 is designed to be etched to form the row conductors L1 to L3. Then the upper, electrically conducting layer 70 and the stack 60 of semiconducting layers are etched simultaneously so that the stack 60, after etching, forms strips 60a that are located beneath the row conductors L1, L2 and consequently have one and the same shape and one and the same area as these conductors L1, L2. In this embodiment, where the stack 60 of semiconducting layers is not etched in the form of islands but is etched in the same way as the row conductors L1, L2, the photosensitive dots P1, P2, P4, P5 that are thus made are located at the intersection of the row conductors L1, L2, and the column conductors F1, F2. The active surface Sa1, Sa2, Sa4, Sa5 (represented by a hatched surface in FIG. 7) of the photosensitive dots P1, P2, P4, P5, is formed solely by the surface of intersection of the row conductors and the column conductors L1, L2, F1, F2. This means that the superimposed diodes Da and Db are formed only between the surfaces of intersection of the row and column conductors, notably because it is solely in the volume located beneath the active surfaces Sa1, Sa2, Sa4, Sa5 that a sufficient electrical field is set up. Consequently, the resistance displayed by the zones Z located between two adjacent photosensitive dots and located beneath one and the same row conductor (the photosensitive dots P1 and P25 for example), is great and these photosensitive dots are not short-circuited. Of course, this technique is made possible by the fact that the active surfaces Sa1 to Sa9 have an area which is "much smaller" than the area of an elementary surface Se1 to Se9.

I claim:

1. Photosensitive device comprising at least one light source (7, 25), a photosensitive matrix (2), an addressing device (46, 42), and a reading device (32), the photosensitive matrix comprising a system of conductors in rows (L1 to L3) and a system of conductors in columns (F1 to F3), the photosensitive matrix (2) having a photosensitive surface (5) formed by a plurality of elementary surfaces (Se1 to Se9), each having a photosensitive dot (P1 to P9), each photosensitive dot being connected between a row conductor (L1 to L3) and a column conductor (F1 to F3), the light source (7, 25) producing a light radiation designed to illuminate a document (10, 10a) located above the photosensitive surface (5), characterized in that it further includes, firstly, an optical pencil (15) emitting a light radiation (16) and enabling the illumination of at least one elementary surface (Se1 to Se9), and in that it includes, secondly, means (Da, Db, GL1 to GL3, GF1 to GF3, 45, 33) to distinguish the row conductor (L1 to L3) and the column conductor (F1 to F3) between which there is connected the photosensitive dot (P1 to P9) located in the elementary surface (Se1 to Se9) illuminated by the optical pencil (15).

2. Photosensitive device according to claim 1, characterized in that each photosensitive dot (P1 to P9) has two series mounted elements (Da, Db), a first element (Da) being formed by a commutation means and a second element (Db) being photosensitive.

3. Photosensitive device according to claim 2, characterized in that the first element (Da) forming the commutation means is a diode.

4. Photosensitive device according to claim 3, characterized in that the diode (Da) forming the commutation means is a photodiode.

5. Photosensitive device according to any one of the claims 2 to 4, characterized in that the second element (Db) is formed by a photosensitive diode.

6. Photosensitive device according to any one of the claims 2 to 4, characterized in that the second element (Db) is a photoresistor.

7. Photosensitive device according to claim 3, characterized in that it comprises means (45, IV1 to IV3) to forward bias the diode (Da) forming the commutation element.

8. Photosensitive device according to any one of the claims 1, 2 or 3, characterized in that each point (P1 to P9) has two diodes (Da, Db) mounted in series with opposite directions of conduction, at least one of the two photodiodes being photosensitive.

9. Photosensitive device according to claim 8, characterized in that it comprises means (45, IV1 to IV3) to bias the two diodes (Da, Db) of each photosensitive dot (P1 to P9) so that a first diode (Da) is forward biased and the second diode (Db) is reverse biased, at least the second diode (Db) being photosensitive.

10. Photosensitive device according to any one of the preceding claims 1-4, characterized in that the photosensitive dots (P1 to P9) have an active surface (Sa1 to Sa9) which is much smaller than an elementary surface (Se1 to Se9).

11. Photosensitive device according to claim 10, characterized in that the active surfaces (Sa1 to Sa9) are equal to or smaller than substantially 90% of an elementary surface (Se1 to Se9).

12. Photosensitive device according to any one of the preceding claims 1-4, characterized in that the light source (7) is located beneath the photosensitive matrix (2), opposite the document (10).

13. Photosensitive device according to claim 12, characterized in that a screen (12) opaque to light is interposed between the light source (7) and the photosensitive dots (P1 to P9).

14. Photosensitive device according to any one of the preceding claims 1-4, characterized in that it further comprises a display device (7, 20) placed beneath the photosensitive matrix (2) so as to project an image that is visible through the photosensitive matrix (2).

15. Photosensitive device according to claim 14, characterized in that the display device (20) is of the liquid crystal type.

16. Photosensitive device according to claim 15, characterized in that the liquid crystal display device (20) is placed between the photosensitive matrix (2) and the light source (7).

17. Photosensitive device according to claim 14, characterized in that the display device (7) further constitutes a light source.

18. Photosensitive device according to any one of the claims 1 to 4, characterized in that the light source (25) is located above the photosensitive surface (5).

19. Photosensitive device according to claim 8, characterized in that the photosensitive matrix (2) comprises a substrate (3) on which the column conductors (F1 to F3) are made, and in that the two diodes (Da, Db) of a photosensitive dot (P1 to P9) are formed with a stack (60) of five superimposed semiconducting layers (62, 63, 64, 65, 66), the third layer (64) or middle layer being common to both diodes (Da, Db).

20. Photosensitive device according to any one of the above claims 1-4, characterized in that the photosensitive matrix (2) has a substrate (3) bearing a stack (60) of semiconducting layers arranged between column conductors (F1 to F3) and row conductors (L1 to L3), the stack (60) of semiconducting layers being etched so as to form strips (60a) each located beneath each row conductor (L1 to L3) and obtained by a simultaneous etching of the row conductors (L1 to L3) and of the stack (60) of semiconducting layers.

21. Photosensitive device according to claim 20, characterized in that the active surface (Sa1) of a photosensitive dot (P1 to P9) is equal to or smaller than substantially 50% of an elementary surface (Se1 to Se9).

22. Photosensitive device according to claim 15, characterized in that the photosensitive matrix (2) has a transparent substrate (4) which further constitutes a wall (21) of the display device (20).

23. Photosensitive device according to any one of the preceding claims 1-4, characterized in that the photosensitive matrix (2) has a substrate (3) bearing a stack (60) of semiconducting layers placed between column conductors (F1 to F3) and row conductors (L1 to L3), and wherein an insulating and transparent layer (71) is deposited opposite the substrate to form a mechanical protection screen (9).

* * * * *